United States Patent [19]

Pruett et al.

[11] Patent Number: 4,723,807

[45] Date of Patent: Feb. 9, 1988

[54] WHEEL AND TRACK SYSTEM

[75] Inventors: David M. Pruett; Robert D. Brown, both of Canon City, Colo.

[73] Assignee: Portec, Inc., Oak Brook, Ill.

[21] Appl. No.: 855,923

[22] Filed: Apr. 25, 1986

[51] Int. Cl.$^4$ .............................................. B60B 17/00
[52] U.S. Cl. ........................................ 295/1; 295/19
[58] Field of Search ................... 104/242, 306; 295/1, 295/9 R, 19, 20, 35; 105/155; 238/122, 127, 128; 16/90, 91, 97, 98, 102, 106, 107; 384/58, 901; 301/37 S, 37 T, 37 TC

[56] References Cited

U.S. PATENT DOCUMENTS

| | | | |
|---|---|---|---|
| 1,435,086 | 11/1922 | Shannon | 301/37 TC |
| 1,491,001 | 4/1924 | Cralley | 16/90 X |
| 1,748,309 | 2/1930 | Rose | 104/306 X |
| 2,912,288 | 11/1959 | Griswold, Jr. | 384/58 X |
| 3,334,375 | 8/1967 | Hubbard | 16/97 |
| 3,861,315 | 1/1975 | Rypinski | 105/155 X |
| 4,457,046 | 7/1984 | Vater | 16/102 X |
| 4,502,628 | 3/1985 | Sarantitis | 238/122 |

FOREIGN PATENT DOCUMENTS 623811 9/1978 U.S.S.R. .................................. 295/1

*Primary Examiner*—Robert B. Reeves
*Assistant Examiner*—Russell D. Stormer
*Attorney, Agent, or Firm*—Klaas & Law

[57] ABSTRACT

A wheel and track system wherein the track comprises a base and a pair of spaced apart upstanding sides is provided for guiding movement of a vehicle having four wheels over a controlled path and at least two of the wheels are mounted for rolling movement over the base and between the spaced apart upstanding sides and wherein a scuff plate is provided between the two wheels and the upstanding sides of the track so that there can be relative rotational movement between the scuff plates and the wheel and relative movement between the scuff plates and the upstanding sides of the track in the event of contact between the scuff plates and the upstanding sides of the track so as to minimize any tendency for the wheel to ride up the upstanding side and also to protect the upstanding side and the wheel from damage.

20 Claims, 7 Drawing Figures

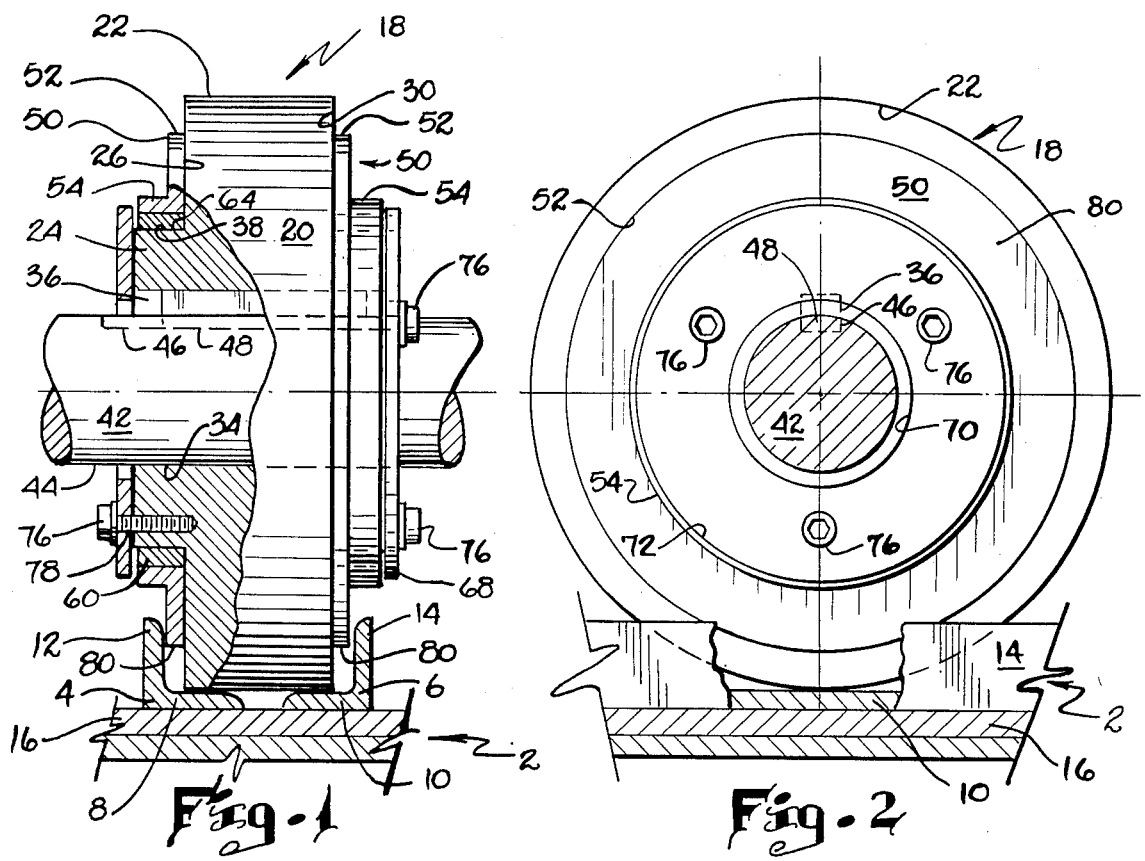
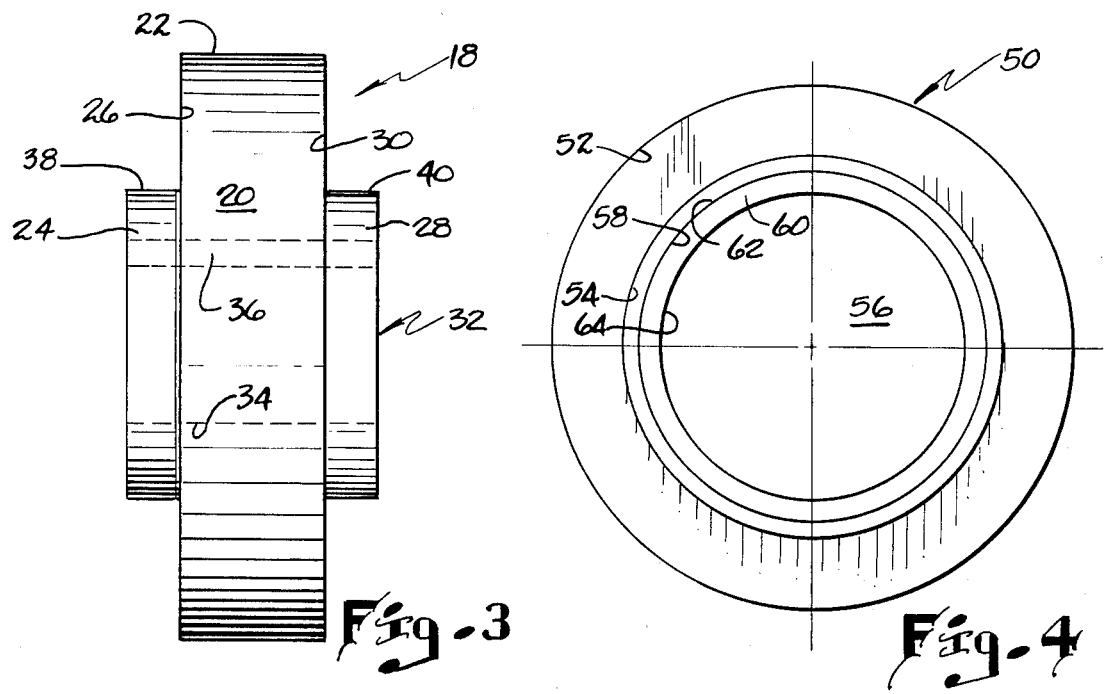

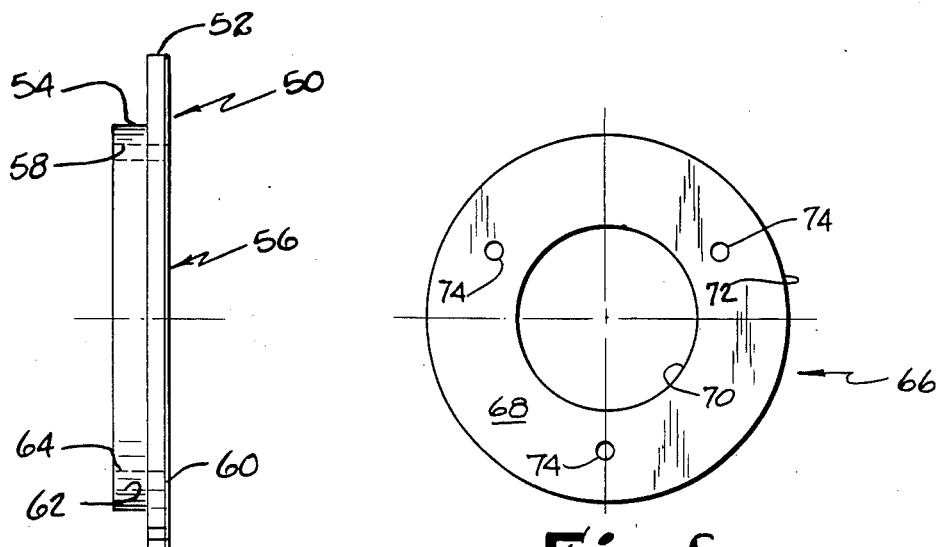
Fig. 5
Fig. 6
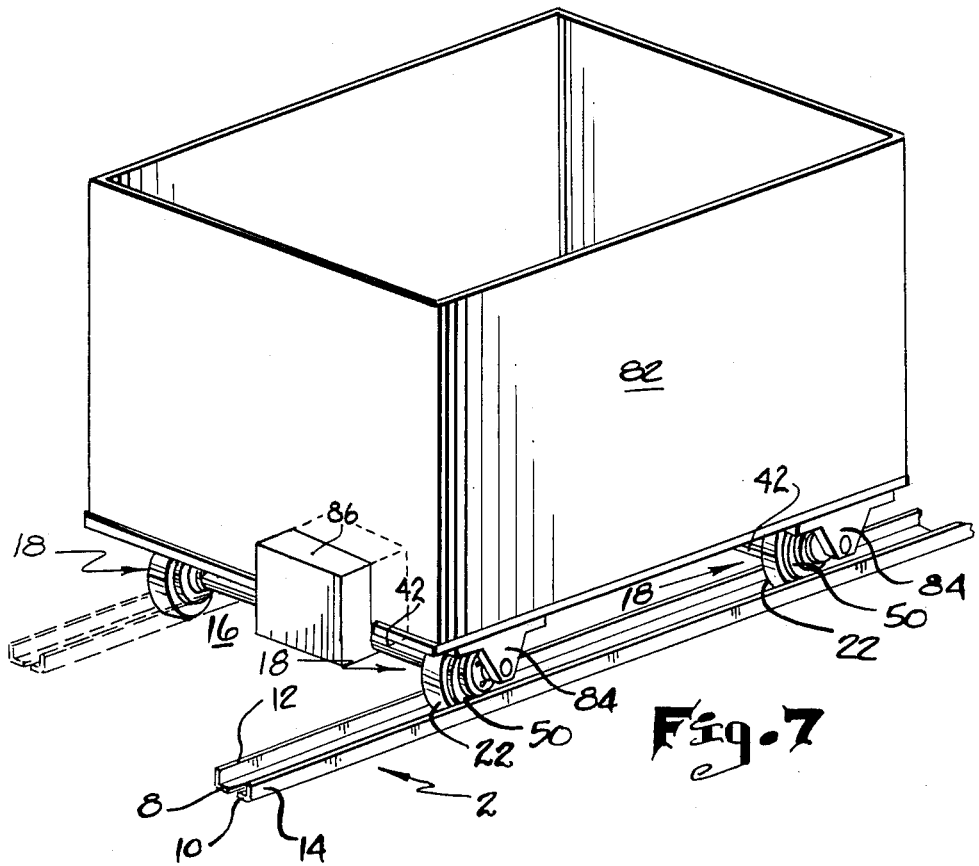
Fig. 7

WHEEL AND TRACK SYSTEM

FIELD OF THE INVENTION

This invention relates generally to the use of wheels mounted on a vehicle so that the vehicle may be moved over a surface in a controlled path and more particularly to such a vehicle that is to be moved over a track means having spaced apart upstanding side means with the wheel being located between the spaced apart upstanding side means.

BACKGROUND OF THE INVENTION

In many types of commercial operations it is necessary to move a vehicle over a controlled path. This may be accomplished by providing the vehicle with one or more wheels and positioning the one or more wheels in one or more track means secured in the desired path of movement. One such system employs a V-shaped track means with correspondingly shaped wheels. One problem associated with this system is that the wheels have a tendency to climb out of the track means. Another system is a crowned rail type for confining the wheel. This crown rail type is recessed in the floor and is costly.

BRIEF DESCRIPTION OF THE INVENTION

This invention relates to a wheel and track system wherein the wheel is located between two upstanding side means of the track means and is provided with means to minimize any tendency for the wheel to ride up the upstanding side means and also to function to protect the wheel and the upstanding side means from damage.

In a preferred embodiment of the invention, the vehicle has four rotatably mounted wheels, two of which are located in a track means. The track means has at least two spaced apart upstanding side means for guiding the movement of the wheels. Each of the wheels has a central portion having a generally cylindrical outer surface for rolling movement over a base located between the spaced apart upstanding side means. Each wheel has a central hub extending outwardly from each side of the central portion so that the wheel can be mounted on a shaft of the vehicle. Each of the hubs has a generally cylindrical outer surface. Means are mounted on the wheel so as to provide for relative rotational movement between the means and the wheel and are located between the wheel and each of the side means. Such means comprise a scuff plate having a central opening having a generally cylindrical inner surface. A bushing is located between the generally cylindrical outer surface of each hub and the generally cylindrical inner surface of the scuff plate and functions to provide for relative rotational movement between the scuff plate and the wheel. Thus, if the scuff plate on either side of the wheel contacts an adjacent side means, it is free to turn, protecting the wheel and the upstanding side means from damage and also minimizing any tendency for the wheel to ride up over the upstanding side means. If desired, two spaced apart track means may be used.

It is an object of this invention to provide a wheel and track system for guiding a vehicle for movement over a controlled path wherein possible damage to the wheel or track is minimized.

It is another object of this invention to provide a wheel and track system for guiding a vehicle for movement over a controlled path wherein any tendency for the wheel to ride up on the track is minimized.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a front elevational view with parts in section of a preferred embodiment of the invention;

FIG. 2 is a side view of FIG. 1 with parts removed;

FIG. 3 is a front elevational view of the wheel

FIG. 4 is a side elevational view of a scuff plate of this invention;

FIG. 5 is a front elevational view of FIG. 4;

FIG. 6 is a side elevational view of a retaining means of this invention; and

FIG. 7 is a pictorial view of a vehicle having a wheel and track system of this invention.

DETAILED DESCRIPTION OF THE INVENTION

In FIG. 1, there is illustrated a preferred embodiment of this invention. A track means 2 comprises a pair of spaced apart elongated angled channels 4 and 6 having bases 8 and 10 and upstanding sides 12 and 14. It is noted that the track means can be formed differently, such as an elongated U-shaped channel, as long as the upstanding sides 12 and 14 are provided. The chanels 4 and 6 are supported on a fixed surface 16 such as a floor of a building and may be secured thereto by suitable means such as bolts (not shown).

A wheel 18, specifically illustrated in FIG. 3, is provided for rolling movement over the track means 2. The wheel 18 has a central body 20 having a generally cylindrical outer surface 22 to provide for the rolling movement of the wheel 18 over the track means 2. A hub portion 24 extends outwardly from one side surface 26 of the wheel 18 and another hub portion 28 extends outwardly from the other side surface 30 of the wheel 18. A central bore 32 extends through the central body 20 and the hub portions 24 and 28 and has a generally cylindrical inner surface 34 except for a longitudinally extending keyway 36. The outer surface 38 of the hub portion 24 and the outer surface 40 of the hub portion 26 are each generally cylindrical.

In the embodiment of the invention illustrated in FIG. 1, the wheel 18 is a driven wheel. A drive shaft 42 having a generally cylindrical outer surface 44 extends through the central bore 32 and is provided with a longitudinally extending keyway 46. A key 48 having a portion thereof in the keyway 46 and another portion thereof in the keyway 36 functions to rotate the wheel 18 in response to rotation of the drive shaft 42. However, it is to be understood that it is within the concepts of this invention that the wheel 18 can be an idler wheel and be mounted on a shaft by suitable bearing means for free rotation thereof.

A scuff plate 50 for use as a wheel protecting means in the preferred embodiment of the invention is illustrated in FIGS. 4 and 5. The scuff plate 50 comprises and integral unit having two generally cylindrical outer surfaces 52 and 54 with the diameter of the generally cylindrical outer surface 52 being the larger. A central bore 56 extends in a longitudinal direction through the scuff plate 50 and has a generally cylindrical inner surface 58. A bushing 60, comprising bronze or other similar material, is positioned in the central bore 56 and has a generally cylindrical outer surface 62 in contact with the generally cylindrical inner surface 58 of the scuff plate 50. The bushing 60 also has a generally cylindrical inner surface 64 which is used to provide the relative rotational movement between the scuff plate 50 and the wheel 18 as described below. While the bronze bushing 60 is used in the preferred embodiment of the invention, it is understood that other means, such as a bearing, could be used to provide for the relative rotational movement between the scuff plate 50 and the wheel 18.

A retaining means 66 is illustrated in FIG. 6 and comprises a ring shaped member 68 having a generally cylindrical inner surface 70 and a generally cylindrical outer surface 72. The ring shaped member 68 has a plurality of openings 74 therein. As illustrated in FIG. 1, a headed threaded bolt 76 passes through each opening 74 and is secured in a threaded bore 78 in each of the hub portions 24 and 48 to secure the retaining means 66 thereto.

The relative location of the various components during operation of the wheel and track system of this invention is illustrated in FIG. 1. A scuff plate 50 having a bushing 60 mounted therein is positioned over the hub portion 24 so that the generally cylindrical inner surface 64 of the bushing 60 is radially opposite the generally cylindrical outer surface 38 of the hub portion 24. The diameter of the generally cylindrical inner surface 64 of the bushing 60 is sufficiently greater than the diameter of the generally cylindrical outer surface 38 of the hub portion 24 so as to allow loose running of the bushing 60 relative to the hub portion 24. The portion of the inner surfce 34 within the hub portion 24 extends in a longitudinal direction for a distance greater than the longitudinal extent of the bushing 60 or the inner surface 58 of the scuff plate 50. A retaining means 66 is then secured to the hub portion 24 by a plurality of bolts 76. Since the longitudinal extent of the hub portion 24 is greater than the longitudinal extent of the bushing 60 and scuff plate 50, the scuff plate 50 will be able to rotate relative to both the retaining means 66 and the wheel 18.

The partially assembled unit is then positioned on the drive shaft 42 with the keyways 36 and 46 in radial alignment. A key 48 is then positioned with a portion of the key 48 in the keyway 46 and another portion of the key 48 in the keyway 36. The diameter of the generally cylindrical inner surface 70 of each retaining means 66 is greater than the diameter of the drive shaft 42 in an amount sufficient to provide means for retaining the key 48 in the keyways 36 and 46. If desired, a separate retainer ring mounted in a groove provided in the shaft (not shown) may be used for the purpose of retaining the key 48 and wheel 20 in position. A scuff plate 50 having a bushing 60 mounted therein is positioned over the hub portion 28 so that the generally cylindrical inner surface 64 of the bushing is radially opposite the generally cylindrical outer surface 40 of the hub portion 28. The diameter of the generally cylindrical inner surface 64 of the bushing 60 is sufficiently greater than the diameter of the generally cylindrical outer surface 40 of the hub portion 28 so as to allow loose running of the bushing 60 relative to the hub portion 28. The portion of the inner surface 34 within the hub portion 28 extends in a longitudinal direction for a distance greater than the longitudinal extent of the bushing 60 or the inner surface 58 of the scuff plate 50. A retaining means 66 is then secured to the hub portion 28 by a plurality of bolts 76. Since the longitudinal extend of the hub portion 28 is greater than the longitudinal extent of the bushing 60 and the scuff plate 50, the scuff plate 50 will be able to rotate relative to both the retaining means 66 and the wheel 18.

As illustrated in FIG. 1, the assembled wheel 18 is mounted on the track means 2 with the outer surface 22 in contact with the upper surfaces of the bases 8 and 10. Rotation of the drive shaft 42 by suitable conventional means 86 will cause the wheel 18 to rotate so as to have rolling movement over the upper surfaces of the bases 8 and 10. The diameter of the outer surface 52 of the scuff plate 50 is great enough so that a portion 80 of each scuff plate 50 is located between the side 12 of the track means 2 and the side surface 26 of the wheel 18 or between the side 14 of the track means 2 and the side surface 30 of the wheel 18. If for any reason the portion 80 of the scuff plate 50 is moved into contact with either of the sides 12 or 14 of the track means 2, the scuff plate 50 will rotate so as to minimize any tendency to cause damage to the track means 2 or to ride up over either of the upstanding sides 12 and 14.

In one embodiment of the invention, the outer surface 22 of the wheel 18 has a diameter of about 7.50 inches. The diameter of the generally cylindrical inner surface 34 of the central bore is about 1.94 inches with the diameter of the shaft 42 being substantially the same so as to provide a friction fit therebetween. The diameter of each of the generally cylindrical outer surfaces 38 and 40 is about 4.00 inches and the longitudinal extent of each of the hub portions 24 and 26 is betwen about 0.625 and 0.640 inches. The diameter of the generally cylindrical outer surface 62 of the bushing is about 4.50 inches and the diameter of the generally cylindrical inner surface 58 of the scuff plate 50 is substantially the same so as to provide a friction fit therebetween. The diameter of the generally cylindrical inner surface 64 of the bushing 60 is sufficiently larger than the diameter of the generally cylindrical outer surfaces 38 and 40 to allow for a loose running fit therebetween. In this embodiment of the invention, the diameter of the inner surface 64 is between about 4.003 and 4.004 inches. The scuff plate 50 and the bushing 60 each have a longitudinal extent of between about 0.578 and 0.594 inches. The diameter of the outer surface 52 of the scuff plate 50 is about 6.875 inches and the diameter of the outer surface 54 of the scuff plate 50 is about 5.00 inches. The diameter of the inner surface 70 of the retaining means 66 is about 2,125 inches and the diameter of the outer surface 72 is about 4.75 inches. The distance from the axis of the central bore 32 and the radially outermost portion of the keyway 36 is about 2.170 inches.

In FIG. 7, there is illustrated a cart 82 provided with the inventive concepts of this application. The cart 82 is mounted so that two wheels 18 thereof are mounted for rolling movement over track means 2 while two other wheels are moved over the surface 16. The cart 82 has a pair of shafts each having wheel assemblies located adjacent each end of each shaft, three of which are partially illustrated in FIG. 7. The wheel assemblies in the track means 2 are similar to the one illustrated in FIG. 1. Suitable means such as the journal boxes 84 are used to support the ends of the shafts 42. Also suitable means 86 are used to supply power to provide for the movement of the cart 82. For ease of operation the wheels not in the track means 2 may have larger diameters. If desired, a second track means 2 spaced from the illustrated track means and illustrated by dotted lines in FIG. 7 may be provided and the wheels in the second track means are similar to those illustrated in FIG. 1.

It is contemplated that the inventive concepts herein described may be variously otherwise embodied and it is intended that the appended claims be construed to include alternative embodiments of the invention except insofar as limited by the prior art.

What is claimed is:

1. Apparatus for guiding the movement of a vehicle comprising:
   at least one track means comprising base and spaced apart upstanding side means;
   a vehicle having a plurality of wheel means mounted thereon;
   at least one of said wheel means being positioned for movement over said base and between said upstanding side means;
   at least one plate means located between said at least one wheel means and at least one of said upstanding side means to minimize any tendency for said wheel means to move out of position between said upstanding side means;
   said vehicle having at least one shaft;
   said at least one wheel means having a hub for mounting said at least one wheel means on said shaft so that said at least one wheel means may be rotated so as to provide for said movement over said base;
   said hub having at least one portion projecting outwardly from one side of said at least one wheel means;
   means for mounting said plate means on at least one portion of said hub to provide for relative rotational movement therebetween; and
   connecting means for connecting said hub to said shaft for rotation therewith.

2. Apparatus as in claim 1 and further comprising:
   means defining a central opening in said plate means; and
   a bushing located between said at least one portion of said hub and said means defining a central opening in said plate means to provide for said relative rotational movement therebetween.

3. Apparatus for guiding the movement of a vehicle comprising:
   at least one track means comprising a base and spaced apart upstanding side means;
   a vehicle having a plurality of wheel means mounted thereon;
   at least one of said wheel means being positioned for movement over said base and between said upstanding side means;
   said wheel means comprising:
     a central portion having a generally cylindrical outer surface to provide for said movement over said base and at least two side surfaces;
     means projecting outwardly from each of said side surfaces;
     means defining a central opening extending through said central portion and said means projecting outwardly from each of said side surfaces;
     means located between said wheel means and at least one of said upstanding side means to minimize any tendency for said wheel means to move out of position between said upstanding side means comprising:
       at least two plate means; and
       means for mounting one of said plate means on each of said means projecting outwardly from each of said side surfaces so as to provide for relative rotational movement therebetween.

4. Apparatus as in claim 3 and further comprising:
   a pair of spaced apart track means;
   a pair of spaced apart wheels means mounted on said shaft; and
   one of said wheel means in each of said track means.

5. Apparatus as in claim 4 wherein:
   each of said wheel means is connected to said shaft for rotation therewith.

6. Apparatus as in claim 3 and further comprising:
   said vehicle having at least two shafts with the longitudinal axes of said shafts extending parallel to each other;
   a pair of spaced apart wheel means mounted on each of said at least two shafts; and
   two of said wheel means located in said track means.

7. Apparatus as in claim 6 and further comprising:
   means defining a central opening extending through each of said palte means; and
   a bushing located between each of said means projecting outwardly from each of said side surfaces and said means defining said central opening in each of said plate means to provide for said relative rotational movement between said plate means and said means projecting outwardly from each of said side surfaces.

8. Apparatus as in claim 7 and further comprising:
   means for retaining each of said plate means on each of said means projecting outwardly from each of said side surfaces while permitting said relative rotational movement therebetween.

9. Apparatus as in claim 3 wherein:
   each of said means projecting outwardly from each of said side surfaces has a generally cylindrical outer surface;
   means defining a central opening extending through each of said plate means;
   each of said central openings having a generally cylindrical inner surface having a diameter greater than the diameter of each of said generally cylindrical outer surfaces to provide for said relative rotational movement therebetween.

10. Apparatus as in claim 9 wherein:
    each of said means projecting outwardly from said side surfaces terminating in an end surface;
    means secured to said each of said end surfaces for retaining each of said plate means on the associated one of said means projecting outwardly from said side surfaces; and
    each of said central openings extending in a longitudinal direction for a distance less than the distance that each of said generally cylindrical outer surfaces extend in a longitudinal direction so as to provide for rotational movement of each of said plate means relative to the associated one of said means projecting outwardly from said side surfaces and said retaining means.

11. Apparatus as in claim 10 wherein:
    each of said plate means has two outer cylindrical surfaces of different diameters;

the outer cylindrical surface having the greater diameter being located adjacent to one of said side surfaces; and said generally cylindrical outer surface of said wheel means having a diameter greater than the diameter of the greater diameter of said plate means in an amount so that a portion of said plate means lies between said wheel means and an upstanding side means of said track means.

12. Apparatus as in claim 11 and further comprising:

a generally cylindrical outer surface on each of said retaining means having a diameter slightly less than the smaller diameter of one of said generally cylindrical outer surfaces of each of said plate means.

13. Apparatus as in claim 12 and further comprising:

a vehicle having at least two shafts with the longitudinal axes of said shafts extending parallel to each other;

a pair of spaced apart wheel means mounted on each of said at least two shafts; and at least two of said wheel means located in said track means.

14. Apparatus for guiding the movement of a vehicle, said apparatus comprising:

at least one track means comprising a base and spaced apart upstanding side means for guiding the movement of said vehicle;

said vehicle having a plurality of wheel means mounted thereon for supporting said vehicle for rolling movement;

at least one of said wheel means positioned for rolling movement over said base and between said spaced apart upstanding side means with at least a major portion thereof extending above said spaced apart upstanding side means;

wheel protecting means located between said at least one of said wheel means and at least one of said spaced apart upstanding side means to minimize any tendency for said at least one of said wheel means to move out of position between said spaced apart upstanding side means during said rolling movement thereof; and mounting means for rotatably mounting said wheel protecting means to provide for rotation of said wheel protection means relative to said at least one of said wheel means.

15. Apparatus as in claim 14 comprising:

additional wheel protecting means located between said at least one of said wheel means and the other of said spaced apart upstanding side means to minimize any tendency for said at least one of said wheel means to move out of position between said spaced apart upstanding side means during rolling movement thereof; and mounting means for rotatably mounting said additional wheel protecting means to provide for rotation of said additional wheel protecting means relative to said at least one of said wheel means.

16. Apparatus as in claim 15 and further comprising:

at least four wheel means mounted on said vehicle;

at least two of said wheel means positioned for rolling movement over said base and between said spaced apart upstanding side means with a major portion thereof extending above said spaced apart upstanding side means;

at least two shafts mounted at spaced apart locations on said vehicle;

each of said wheel means having a hub portion extending axially outwardly therefrom in opposite directions for mounting each of said wheel means on one of said shafts so that said at least two of said wheel means may be rotated to provide for said rolling movement over said base;

each of said hub portions having spaced apart end surfaces extending generally perpendicular to the shaft on which it is mounted; and each of said wheel protecting means being located between said wheel means and one of said end surfaces and an adjacent one of said spaced apart upstanding side means.

17. Apparatus as in claim 15 wherein each of said wheel protecting means comprises:

a scuff plate means;

rotatable mounting means for mounting said scuff plate means on each of said hub portions for permitting relative rotation between said scuff plate means and said wheel means including said hub portions; and said scuff plate means located to contact adjacent portions of said upstanding side means and prevent contact between said wheel means and said spaced apart upstanding side means.

18. Apparatus as in claim 17 wherein each of said at least two wheel means comprises:

a central body portion having opposite side surfaces and having a generally cylindrical outer surface for rolling movement over said base and having a longitudinal axis about which said cylindrical outer surface rotates;

a central bore extending through said central body portion and said hub portion and having a longitudinal axis coinciding with said longitudinal axis of said body portion;

said shaft passing through said central bore; and means for securing said shaft to said wheel means for rotation therewith.

19. Apparatus as in claim 18 comprising:

each of said hub portions having a generally cylindrical outer surface between said opposite side surfaces and each of said spaced apart end surfaces;

a central bore extending through each of said scuff plate means and having a generally cylindrical inner surface; and bushing means between said generally cylindrical outer surface of each of said hub portions and said generally cylindrical inner surface of each of said scuff plate means for permitting relative rotation therebetween.

20. Apparatus as in claim 19 comprising:

means for retaining each of said scuff plate means on said bushing on each of said hub portions.

* * * * *